No. 695,606. Patented Mar. 18, 1902.
E. F. GRÜN.
LENS SYSTEM.
(Application filed July 3, 1901.)

(No Model.) 2 Sheets—Sheet 1.

Witnesses:
J. M. Fowler Jr.
Thomas Durant

Inventor:
Edward F. Grün,

No. 695,606. Patented Mar. 18, 1902.
E. F. GRÜN.
LENS SYSTEM.
(Application filed July 3, 1901.)
(No Model.) 2 Sheets—Sheet 2.

UNITED STATES PATENT OFFICE.

EDWARD FERDINAND GRÜN, OF SOUTHWICK, ENGLAND.

LENS SYSTEM.

SPECIFICATION forming part of Letters Patent No. 695,606, dated March 18, 1902.

Application filed July 3, 1901. Serial No. 67,028. (No model.)

*To all whom it may concern:*

Be it known that I, EDWARD FERDINAND GRÜN, a subject of the King of Great Britain, residing at Southwick, county of Sussex, England, have invented an Improved Lens System, (for which I have made application for Letters Patent in Great Britain under No. 6,194, dated March 25, 1901,) of which the following is a specification.

The present invention relates to photographic and other lenses, the object being to produce a lens system of very wide angle and of great depth of field and primarily great rapidity.

It is well known that to produce a glass lens of wide angle the lens must comprise a long body of glass. There are three objections to such a lens: first, it is impossible to obtain a piece of pure glass absolutely without flaws and of a length suitable for the purpose; secondly, a lens so produced only forms a clear image of objects in one plane—that is, it has no depth of field; thirdly, such a body of glass necessarily absorbs a large percentage of the actinic rays which pass through it, and it is unsuitable for the purposes of photography.

According to this invention as applied to a lens system for a telescope, photographic camera, or similar apparatus two or more achromatic lenses are mounted in a tube or cylinder, and the space between the lenses is filled with a fluid having as nearly as possible the same refractive index as the substance forming the lenses, the fluids chosen having practically no dispersive power of light. Thus by placing two achromatic lenses at a considerable distance apart and filling up the space between them with a liquid of the kind described a long lens of very wide angle will be obtained which will be open to none of the objections which have been applied above to the solid glass lens. The internal concavities which must exist in all achromatic lenses are thereby abolished as far as the refraction is concerned; but their achromatizing influence is still retained. By this means the whole available convexity is retained and a lens of very short focus and of considerable depth of field is formed.

Figure 1:
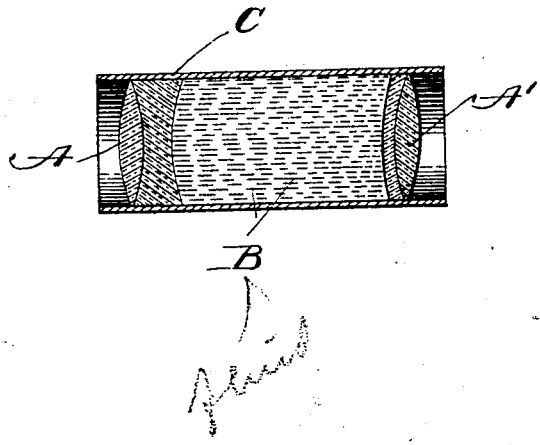
Figure 2:
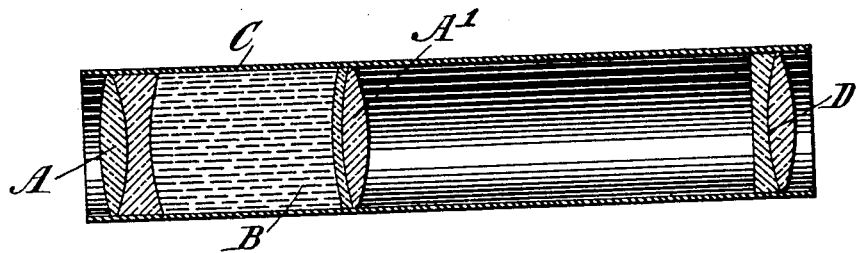

The accompanying drawings show sectional elevations of lenses constructed in accordance In Figure 1, A A' are the achromatic lenses, which may be of the same or of different foci and are mounted at some distance apart in a tube or holder C, the space between the lenses being filled with fluid B. In Fig. 2 a third lens D is shown in addition to the above, an air-space being left between A' and D.

With glass such as is generally employed in the manufacture of lenses it has been found that cedar-oil or monobromid of naphthalene possessing nearly the same index of refraction as the glass answers the purpose well; but any fluid may be employed, so long as it possesses nearly the same refractive index as the material of which the lens is formed, provided such fluid, so far as its quality of dispersing rays of light is concerned, does not materially differ from cedar-oil. Preferably I employ a fluid of such a nature that ordinary changes of temperature do not appreciably affect it.

By employing a fluid of the class above mentioned I am able to produce a lens in which all appreciable internal diffraction and reflection are eliminated. The focal distance of the lens combination is considerably reduced, and the effect of this reduction of the focal length is to give an image of intense brilliance and capable of producing a photographic negative in faint or imperfect light, where it has hitherto been impossible to take photographs. A compound lens formed by this arrangement has a higher aperture than any lenses hitherto constructed, and on account of the high aperture of the lens it is specially adapted for kinematograph or similar photographic work or for taking photographs or observations when the light available is dim or of a low actinic power, the image being projected through the lenses onto a photographic or other screen with great clearness of illumination.

With the improved lens system not only is the focal distance reduced, as above stated, but the focal depth is greatly increased. Lenses having higher aperture than, say, $F^3$ have hitherto been impracticable, as the spherical abberration is so great that it distorts the image and renders it valueless for photographic or like purposes.

Many other advantages besides increase of system. By its use photographs may be taken in light in which the objects are just visible to the human eye—that is to say, stage and moonlight effects—and owing to the rapidity of the lens system rapidly-moving objects can be photographed in daylight more accurately and producing better results than hitherto. The power of telescopes having the improved lens system is enormously increased, as hitherto the chief obstacle has been the production of object-glasses equivalent in optical effect to glasses of much larger diameter, and such glasses having a short focal length can readily be constructed according to this invention.

The fluid employed is preferably cedar-oil, as it has been found that it absorbs less light than glass; but this invention also includes the use of glycerin, monobromin of naphthalene, sandalwood-oil, essential oil of copaiba, or any other substances having approximately the same index of refraction as the material forming the lens and having substantially the same dispersive quality as cedar-oil.

What I claim as my invention, and desire to secure by Letters Patent, is—

1. In a wide-angle lens system the combination with two achromatic lenses at some distance apart of a body of fluid disposed in the space between the achromatic lenses and having approximately the same refractive index as the lenses substantially as and for the purpose described.

2. In a wide-angle lens system the combination with two achromatic lenses at some distance apart of a body of cedar-oil disposed in the space between the lenses and having approximately the same refractive index as the lenses substantially as and for the purpose described.

3. In a wide-angle lens system the combination with a plurality of achromatic lenses at some distance apart of a body of fluid disposed in the space between two of the achromatic lenses and having approximately the same refractive index as the lenses substantially as and for the purpose described.

In testimony whereof I have signed my name to this specification in the presence of two subscribing witnesses.

EDWARD FERDINAND GRÜN.

Witnesses:
JAMES BACON RYE,
WILMER M. HARRIS.